Figure 1:
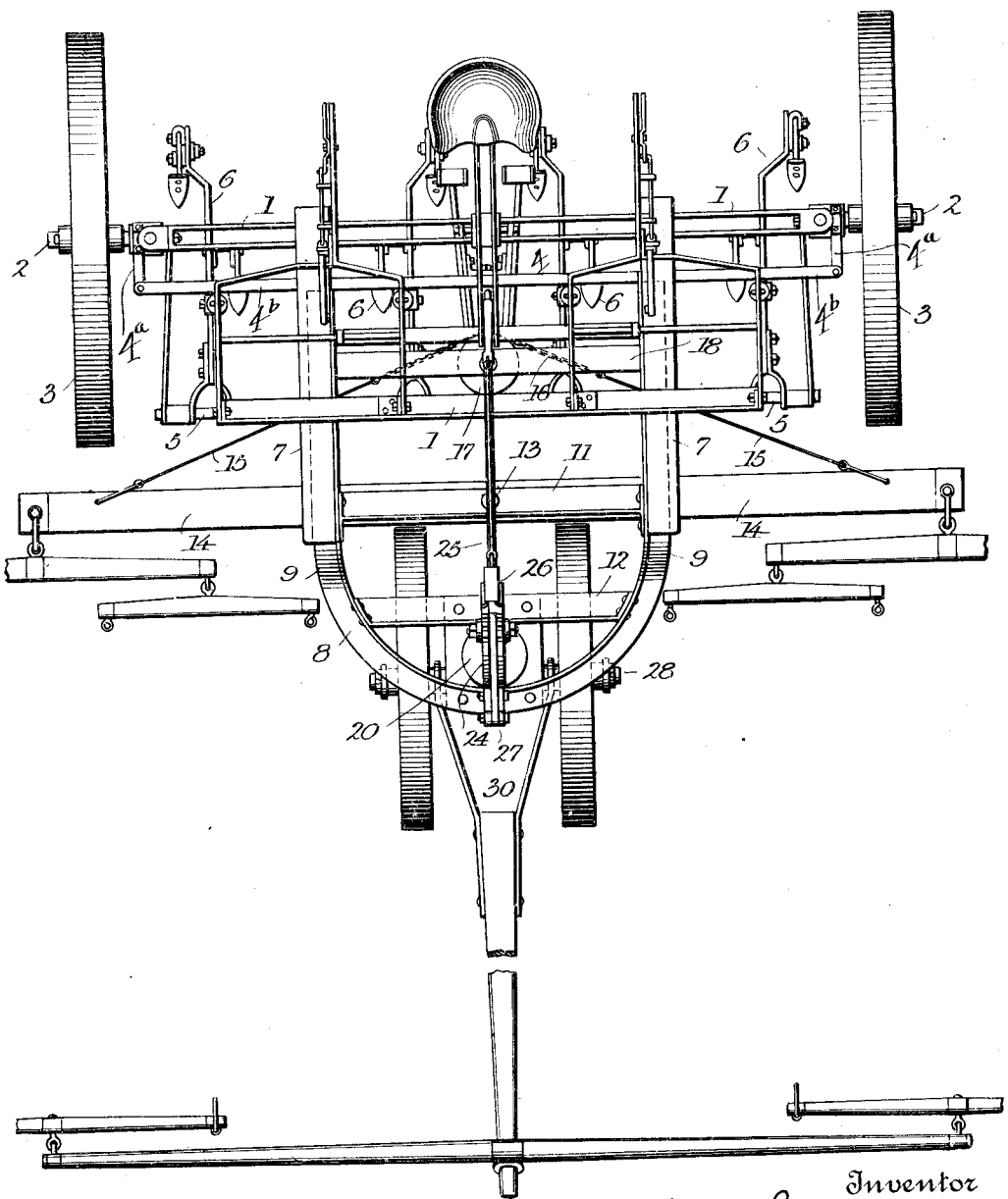

D. E. LONG.
DOUBLE ROW CULTIVATOR.
APPLICATION FILED DEC. 30, 1908.

1,132,480.

Patented Mar. 16, 1915.
3 SHEETS—SHEET 1.

D. E. LONG.
DOUBLE ROW CULTIVATOR.
APPLICATION FILED DEC. 30, 1908.

1,132,480.

Patented Mar. 16, 1915.
3 SHEETS—SHEET 2.

Witnesses

Inventor
D. E. Long
By P. T. Dodge
Attorney

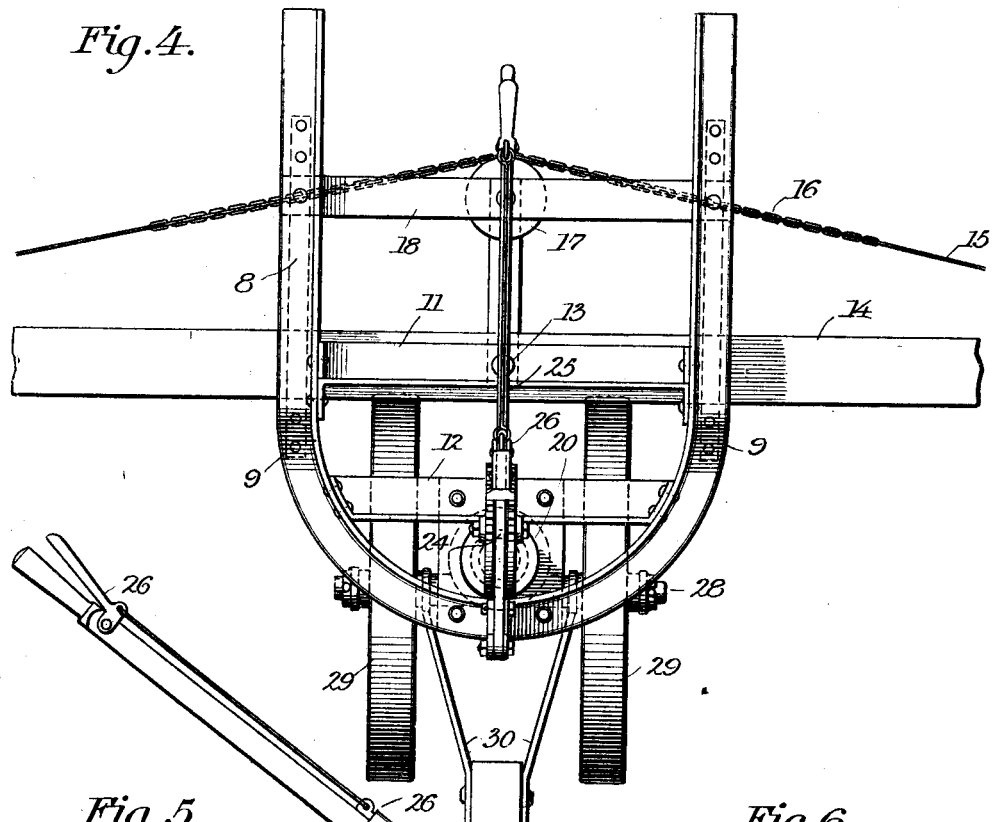
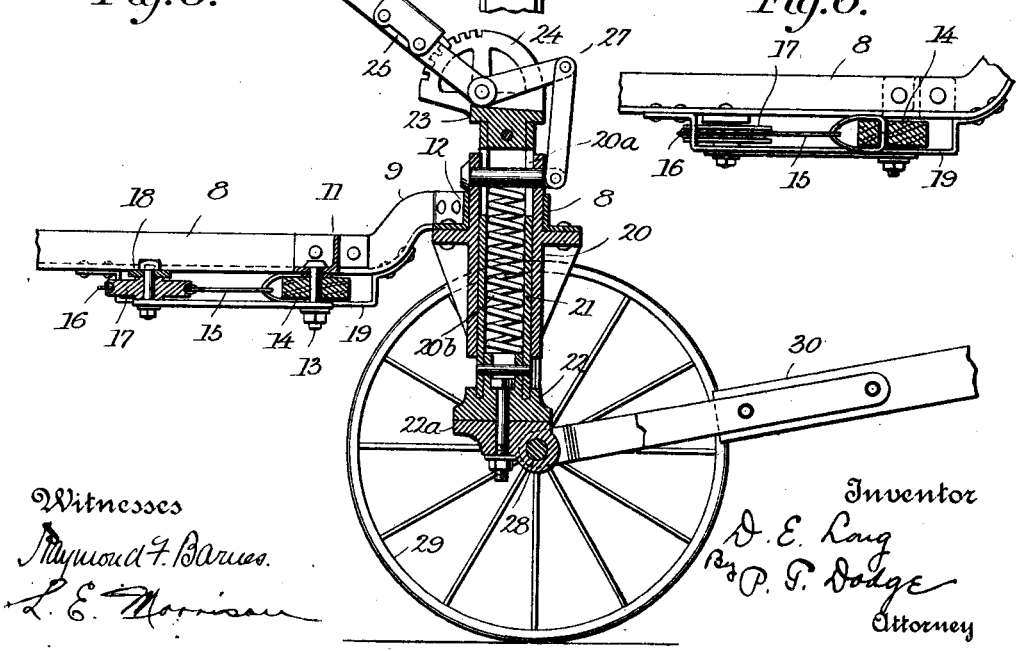

UNITED STATES PATENT OFFICE.

DON E. LONG, OF PEABODY, KANSAS.

DOUBLE-ROW CULTIVATOR.

1,132,480.     Specification of Letters Patent.     Patented Mar. 16, 1915.

Application filed December 30, 1908. Serial No. 469,962.

*To all whom it may concern:*

Be it known that I, DON E. LONG, of Peabody, county of Marion, and State of Kansas, have invented a new and useful Improvement in Double-Row Cultivators, of which the following is a specification.

My invention relates to improvements in double row cultivators and is applicable more particularly to those forms of double row cultivators in which a rectangular frame is sustained at its rear end by an axle carried by ground wheels, the said frame being provided with projecting tongues for the attachment of the draft animals and the forward end of the rectangular frame carrying a suspended draft bar to which the gang bars are attached and in which the plows are elevated and depressed by suitable levers pivoted above the axle and attached by links to the plow beam. In these cultivators the arrangement of parts is such that not only the weight of the frame and tongue, but also the weight of the plow beams and their parts, are largely sustained by the neck yoke, and act as a dead weight upon the necks of the horses. In addition to this weight, the strain exerted by the force required to draw the plows through the ground acts to depress the forward part of the frame work and adds great pressure in a downward direction upon the neck yoke. These plows are usually provided with some form of steering gear by which the ground wheels are turned by the driver or operator independently of the movement of the team. This turning movement results in a pressure in a sidewise direction upon the tongues and a consequent side strain upon the neck yoke and upon the animals.

My invention is designed to remove these difficulties and maintain the frame of the machine and the attached beams on a level, and consists broadly in providing the forward end of the frame-work of the cultivator with a pivoted truck arranged in advance of the hitch-mechanism, and in providing said truck with means whereby the forward end of the frame (and the beams carried thereby) may be raised and lowered in relation to the ground in order to retain said frame-work in a horizontal position and also to equalize the several cultivator-shovels sustained by said beams relatively for the same depth of cultivation for all conditions of the ground.

The invention consists further in providing means for hitching the draft-animals to the main frame of the machine at a point to the rear of the truck whereby the draft-animals are placed in close proximity to the forward central end portion of the main frame, and by which arrangement the steering of the truck, due to movement of the attached tongue, may be accomplished independently of the draft or pull of the animals.

The invention consists further in providing the truck (upon which the independently steered frame is supported at its front end) with two wheels arranged relatively close together, and, also, in supporting upon said truck, means for raising and lowering the frame at its forward end in relation to the ground whereby the cultivator-shovels are positioned.

Figure 2:
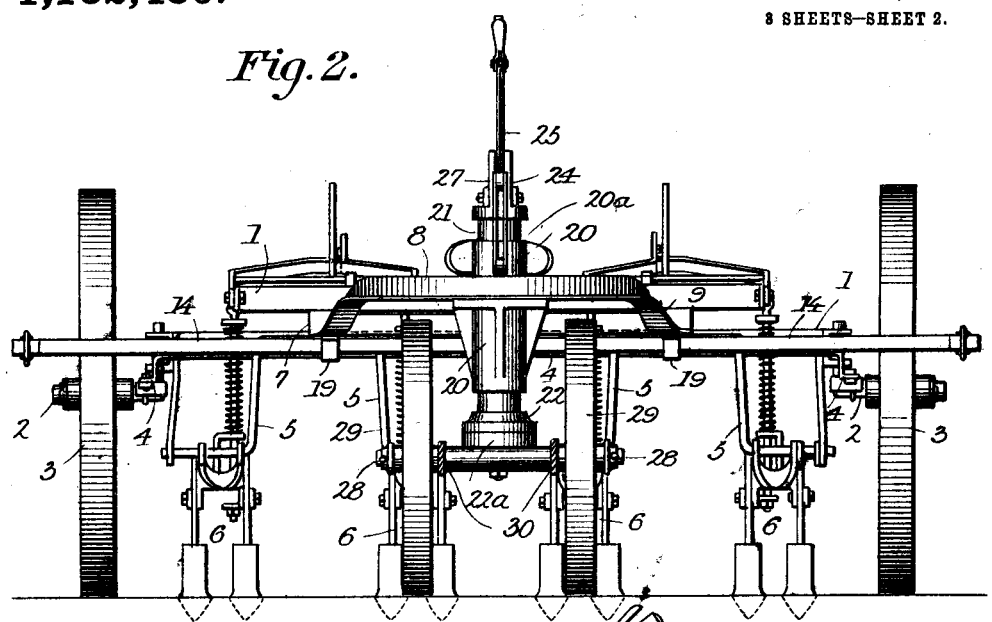
Figure 3:
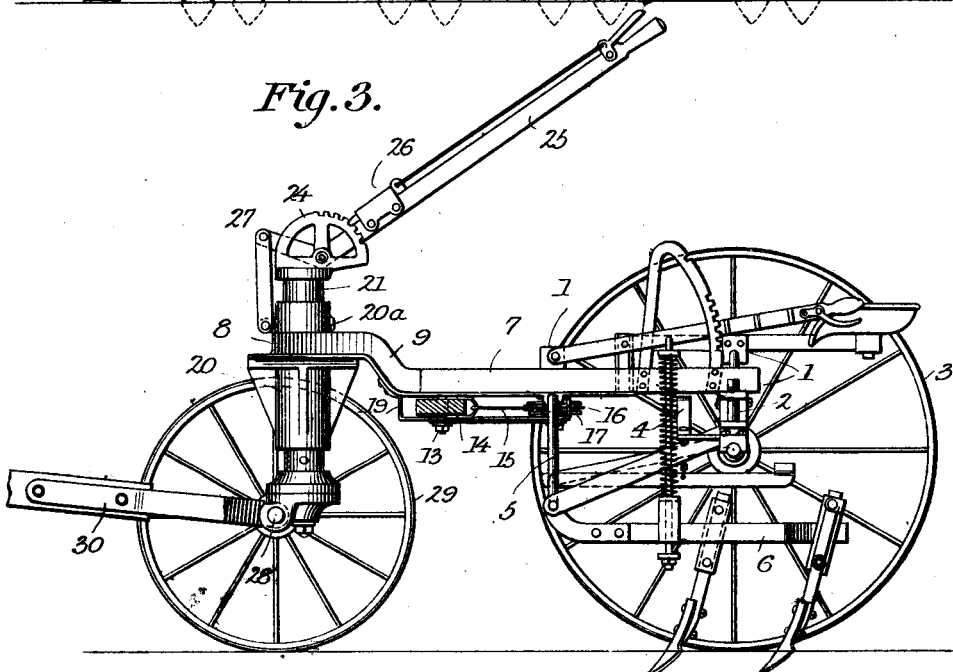

Referring to the drawings:—Figure 1 is a plan view of a cultivator with my improvement embodied therein. Fig. 2 is a front elevation of the same. Fig. 3 is a sectional side elevation. Figs. 4, 5 and 6 are details on an enlarged scale of the draft mechanism and attached elevating and depressing means.

In the accompanying drawings, wherein similar letters of reference are used to indicate corresponding parts in each of the several views:—1 indicates the frame-work of the cultivator, provided at its rear end on each side with pivoted stub axles 2, upon which are mounted ground wheels 3. These axles are capable of rotation through the operation of the steering mechanism 4. Rigidly attached to each of the stub-axles 2 is a short link 4$^a$, and pivotally connecting with each of these links is a transverse bar 4$^b$. When this bar is actuated by the driver, by hand or foot, it will be positioned at an angle to its normal position, and whereby the links 4$^a$ are moved to turn the wheels in one or the other direction, as the driver may desire to position them. The forward end of the frame 1 carries an arch bar 5 to which is attached a series of drag bars supporting plows 6 forming the gangs by means of which two rows may be cultivated. Projecting forwardly from the frame 1 in a position to ride above the rows are two tongues 7, which in the usual construction of the machine would project forward and be connected with a neck yoke. As shown in the drawings, however, these tongues are cut off at a short distance in front of the forward end of the frame and to the stubs thus formed is attached a frame 8, preferably made of angle-iron and U-shaped and preferably though not necessarily bent upwardly, as shown at 9, whereby I am enabled to employ higher truck-supporting wheels 29 (hereinafter referred to) which, notwithstanding their height, will clear the frame when said truck turns in either direction. Said frame need not necessarily be U-shaped, but is so made to prevent contact with the draft animals in operating the machine and gives greater strength to the structure.

The U-shaped frame is braced by cross bars 11 and 12 and is provided with a pivot 13, to which is attached an evener 14, provided at its rear side with links 15 connected to a central chain 16 passing over pulley 17 carried by a cross-piece 18 attached to the U-shaped frame 8. This link and chain form a truss to take the strain upon the evener and thus enable me to use lighter material in the construction of said evener.

The underside of the U-shaped frame is provided at each side with loops or eyes 19, through which the evener is passed and sustained against displacement.

The forward end of the U-shaped frame is rigidly secured to a hollow casting 20, within which is mounted a plunger 21, preferably tubular in form and attached at its lower end to a fifth wheel 22. The plunger 21 is slotted as shown at 20ª and a pin is passed through the slot in such manner as to prevent rotation of the plunger and to act as a stop for the upper end of a spring 20ᵇ which rests at its lower end on the top of the fifth wheel 22, previously referred to and which aids in controlling the operation of the actuating lever (hereinafter referred to) by facilitating the raising of the plunger and, thus, of the frame, and by cushioning the frame when it is depressed. The plunger, spring, etc., are preferably housed within the casting 20, as shown.

The upper end of the plunger is provided with a casting 23 having attached thereto a sector or rack 24, having pivoted thereto a lever 25 with the usual handle and pawl arrangement 26 adapted to engage with the rack. The forward end of the lever 25 is extended as shown at 27 and connected by a pivoted link to the pin which extends through the slot 20ª in the upper end of the plunger 21. The arrangement of parts is such that movement of the lever 23 will raise and lower the U-shaped frame and the forward end of the frame of the cultivator in relation to the fifth wheel of the machine and the truck to which the fifth wheel is attached.

The lower casting 22ª of the fifth wheel has attached thereto a short axle 28, upon which is mounted a pair of supporting wheels 29 adapted to straddle the center of the space between the two cultivated rows. These wheels should be and are preferably such distance apart as to straddle the ridge left by lister cultivation of corn, or the intermediate ridge left by plowing. A tongue 30 is pivoted to the axle 28 between the said supporting wheels 29 and extends forward for attachment to the neck-yoke. The doubletrees and swingletrees are attached to either end of the evener previously referred to, and it will be noted in connection with this that the only weight sustained by the necks of the horses is that of the forwardly extending tongue 30.

As will be observed by reference to the drawings, the truck supporting wheels 29 are centrally located at the forward end of the frame and serve both as a support to the forward end of the frame and as a point upon which leverage may be exerted to retain the frame and suspended plow beams in a level and effective position at all times. The truck supporting wheels 29 also serve to take all side strain due to steering action on the rear ground wheel and relieve the necks of the horses from this burden.

As will be apparent from the drawings, the draft animals in my machine are hitched to the machine in rear of the forward truck arrangement and therefore the draft is on the main frame of the machine and not on the truck, as usual in this class of machines.

The operation of the mechanism described is obvious.

While I have shown a draft attachment and my improvement applied to a double row cultivator of a usual type, it is apparent that similar application could be made to other implements of a like nature and that such application of this improvement would be within the scope of my invention.

Having thus fully described my invention what I claim and desire to secure by Letters Patent is:—

1. In a cultivator, the combination of a supporting-frame mounted upon ground-wheels widely spaced relatively, a manually-operated steering-mechanism therefor, a truck pivotally secured to said frame and mounted on wheels narrowly spaced with relation to the frame-supporting wheels, and a hitch-device, mounted distinct from said truck, on said frame in proximity to the frame-supporting wheels and to the rear of the truck-wheels and in advance of the manually-operated steering-mechanism, whereby the force which is applied to move the truck is of a pushing character that is transmitted from the frame to the truck.

2. In a cultivator, the combination of a supporting-frame mounted upon ground-wheels widely spaced relatively, a manually-operated steering-mechanism therefor, a tongue-steered truck pivotally secured to said frame and mounted on wheels narrowly spaced with relation to the frame-supporting wheels, and a hitch-device mounted, distinct from said truck, on said frame in proximity to the frame-supporting wheels and to the rear of the truck-wheels and in advance of the manually-operated steering-mechanism, whereby the force which is applied to move the truck is of a pushing character that is transmitted from the frame to the truck.

3. In a cultivator, the combination of a supporting-frame mounted upon a pair of ground-wheels widely spaced relatively, a manually-operated steering-mechanism therefor, a tongue-steered truck pivotally secured to said frame and mounted on wheels narrowly spaced with relation to the frame-supporting wheels, and a hitch-device mounted, distinct from said truck, on said frame in proximity to the frame-supporting wheels and to the rear of the truck-wheels and in advance of the manually-operated steering-mechanism, whereby the force which is applied to move the truck is of a pushing character that is transmitted from the frame to the truck.

4. A cultivator including in combination, a supporting-frame mounted upon a pair of ground-wheels, a pivoted truck provided with a pair of wheels narrowly spaced relatively to said frame-supporting wheels, a pivotal connection between the frame and the truck, and a hitch-device mounted on said frame in close proximity to the frame-supporting wheels and to the rear of the truck-wheels, whereby the supporting-frame is drawn and the truck is pushed when the structure is moving, the force applied to the frame being transmitted through said pivotal connection to the truck.

5. A cultivator including in combination, a supporting-frame mounted upon a pair of ground-wheels, a manually-operated steering-mechanism therefor, a pivoted truck provided with a pair of wheels narrowly spaced relatively to said frame-supporting wheels, a pivotal connection between the frame and the truck, a hitch-device mounted on said frame in close proximity to the frame-supporting wheels and to the rear of the truck-wheels, whereby the supporting-frame is drawn and the truck is pushed when the structure is moving, the pushing force applied to the frame being transmitted through said pivotal connection to the truck, and means for independently steering the truck.

6. A cultivator including in combination, a supporting-frame mounted upon a pair of ground-wheels, a manually-operated steering-mechanism therefor, a pivoted truck provided with a pair of wheels narrowly spaced relatively to said frame-supporting wheels, a pivotal connection between the frame and the truck, a hitch-device mounted on said frame in close proximity to the frame-supporting wheels and to the rear of the truck-wheels, whereby the supporting-frame is drawn and the truck is pushed when the structure is moving, the pushing force applied to the frame being transmitted through said pivotal connection to the truck, means for independently steering the truck, and means for elevating and lowering the forward end of the frame in relation to the truck.

7. A cultivator including in combination, a supporting-frame mounted upon a pair of ground-wheels, a manually-operated steering-mechanism therefor, a pivoted truck provided with a pair of wheels narrowly spaced relatively to said frame-supporting wheels, a pivotal connection between the frame and the truck, a hitch-device mounted on said frame in close proximity to the frame-supporting wheels and to the rear of the truck-wheels, whereby the supporting-frame is drawn and the truck is pushed when the structure is moving, the pushing force applied to the frame being transmitted through said pivotal connection to the truck, means for independently steering the truck, and means supported entirely on said truck and connecting with said frame for elevating and lowering its forward end in relation to the ground.

8. A cultivator including in combination, a main supporting-frame mounted upon ground-wheels widely spaced relatively, a manually-operated steering-mechanism therefor, a forward centrally-located elongated frame connected to said main frame, an animal-steered truck pivotally connected to the front of the forward frame and provided with relatively closely-spaced wheels, and a hitch-device mounted on one of said frames and in relatively close proximity to the frame-supporting wheels and to the rear of the truck-wheels, whereby the force which is applied to move the truck is of a pushing character that is transmitted from the frame to the truck.

9. A cultivator including in combination, a main supporting-frame mounted upon ground-wheels widely spaced relatively, a manually-operated steering-mechanism therefor, a forward centrally-located elongated frame connected to said main frame, an animal-steered truck pivotally connected to the front of the forward frame and provided with relatively closely-spaced wheels, a hitch-device mounted on one of said frames and in relatively close proximity to the frame-supporting wheels and to the rear of the truck-wheels, whereby the force which is applied to move the truck is of a pushing character that is transmitted from the frame to the truck, and means carried by said truck and connecting with said forward frame for simultaneously elevating and lowering the forward ends of both frames in relation to the ground.

10. In a cultivator, the combination with a supporting-frame, of a wheel-truck pivotally connected to the forward part of said frame and provided with a pair of relatively closely-spaced wheels, and frame raising and lowering means supported on said frame and truck and including a tubular member disposed intermediate of said wheels and a spring-actuated plunger member working therein, and a lever device attached to one of said members and connecting with said frame, and cultivating-implements carried by said frame and adapted to be positioned in relation to the ground by the movement of said lever device through the instrumentality of said supporting frame.

11. In a cultivator, the combination with an elongated frame having supporting wheels and frame-steering means supported on the frame, of a pivoted truck, a pivotal connection between the truck and frame, truck-steering means operable independently of the frame-steering means, a hitch-device disposed on said frame to the rear of the wheels of the truck and in proximity to the frame-supporting wheels and in advance of the frame-steering means, whereby the force applied to the truck is of a pushing character that is transmitted from the frame through the pivotal connection to the truck, and means for raising and lowering the forward end of the frame and the hitch-device.

12. In a cultivator, the combination with a main frame, frame-steering means thereon, and frame-supporting wheels, of an elongated supplemental frame secured to the forward part of the main frame, a pivoted truck, a pivotal connection between the truck and supplemental frame, a hitch-device mounted on one of said frames to the rear of the wheels of said truck and in proximity to the frame-supporting wheels, and in advance of the main frame, whereby the force which is applied to the truck is of a pushing character that is transmitted from the main frame through the supplemental frame to the truck, a draft-device connected to said truck and coöperating therewith to steer the frame independently of the actuation of said frame-steering means, and means on said truck for raising and lowering the forward end of said main frame.

13. A cultivator including in combination, a main frame, relatively widely-spaced frame-supporting wheels therefor, a frame-steering mechanism carried by said main frame, an elongated U-shaped frame secured to the forward part of the main frame, a pivoted truck having relatively closely-spaced wheels, a pivotal connection between the truck and the U-shaped frame, and a hitch-device including an evener attached to one of said frames to the rear of the truck-wheels and in close proximity to the frame-supporting wheels and in advance of the frame-steering mechanism, whereby a pushing force is transmitted from said main frame through said U-shaped frame to the truck.

14. In a cultivator, the combination with a main frame, supporting-wheels therefor, and frame-steering mechanism thereon, of an elongated supplemental frame secured to the forward portion of said main frame, a draft-device for steering said truck independently of the main frame, and a hitch-device mounted on said supplemental frame to the rear of the wheels of said truck and in proximity to the supporting-wheels.

15. In a cultivator, the combination with a main frame having supporting-wheels and a plurality of cultivator-shovels or the like supported on said frame, of an elongated supplemental frame secured to the forward part of said main frame, a frame-steering mechanism carried by said main frame and operable by the driver, a truck, a pivotal connection between said truck and the supplemental frame, means carried by said truck and connecting with said supplemental frame for positioning the same in relation to the ground and including a plunger adapted to slide in said supplemental frame, a lever-device connecting therewith and with the supplemental frame whereby the main frame may be raised and lowered, a hitch-device and an evener-device mounted on one of said frames to the rear of the wheels of the truck and in proximity to the supporting-wheels and in advance of the frame-steering means, whereby the force which is applied to the frames is transmitted therefrom through the pivotal connection to the truck.

16. A cultivator including in combination, a main supporting-frame, supporting-wheels therefor, a supplemental frame mounted on the main frame, a wheeled truck, a pivotal connection between said truck and supplemental frame and including a fifth-wheel disposed between the wheels of the truck, means overlying the fifth-wheel for raising and lowering the supplemental and main frames at their forward ends, and hitch-mechanism mounted on said supplemental frame to the rear of the fifth-wheel and in close proximity to the frame-supporting wheels and in juxtaposition to the juncture of the main and supplemental frames, whereby the force applied to said frames is transmitted through said pivotal connection to the truck.

17. A cultivator including in combination, a main supporting-frame, supporting-wheels therefor, a supplemental frame mounted on the main frame, a wheeled truck, a pivotal connection between said truck and supplemental frame and including a fifth-wheel disposed between the wheels of the truck, means overlying the fifth-wheel for raising and lowering the supplemental and main frames at their forward ends, hitch-mechanism mounted on said supplemental frame to the rear of the fifth-wheel and in close proximity to the frame-supporting wheels and in juxtaposition to the juncture of the main and supplemental frames, whereby the force applied to said frames is transmitted through said pivotal connection to the truck, and a tongue-device secured to the truck and operable to steer the same independently of the action of the hitch-mechanism.

18. A cultivator including in combination, an elongated frame, frame-supporting wheels mounted on said frame, a plurality of ground-cutting members supported on said frame, a wheeled truck to which the forward end of said frame is attached, a pivotal connection between the truck and the frame, lever-mechanism mounted on the truck and connection with the frame and operable for raising the forward end thereof to effect a positioning of the cutting members relatively to the ground, hitch and evener-mechanism mounted on the frame to the rear of the wheels of the truck and remote from the pivotal connection between the truck and the frame and in close proximity to the frame-supporting wheels, whereby the force applied to the frame is transmitted therefrom through the pivotal connection to the truck, and a tongue connected to the truck.

19. In a cultivator, the combination of a main frame, frame-supporting wheels mounted thereon, a plurality of ground-cutting members supported on said frame, a wheeled-truck to which the forward end of said frame is pivotally connected, lever-mechanism mounted on said truck and connecting with said frame and operable for raising the forward end of the frame to position the forward ends of said cutting members relatively to the ground, a draft-device connected to said truck, and whereby the latter may be steered by the draft animals, frame steering mechanism independent of said draft device, a hitch and evener mechanism mounted on said frame at the side of the pivotal connection of the truck opposite to that to which the draft-device is connected and at a point in proximity to the frame-supporting wheels, whereby force applied to the frame is transmitted therefrom to said truck to facilitate operation of the frame-steering mechanism.

20. The combination of a main supporting-frame mounted on ground-wheels, a supplemental U-shaped frame secured to said main frame, a two-wheel truck, a pivotal connection between the truck and U-shaped frame, a fifth-wheel mounted on said truck, lever-mechanism supported above said fifth-wheel and operable to raise and lower said U-shaped frame, and comprising a lever extending rearwardly from said fifth wheel, hitch-mechanism supported on one of said frames to the rear of said fifth-wheel, an evener connecting with said hitch-mechanism and disposed to the rear thereof whereby the force developed through said hitch-mechanism on said frame is transmitted to said pivotal connection to the truck.

21. The combination of a main supporting-frame mounted on ground-wheels, a supplemental U-shaped frame secured to said main frame, a two-wheel truck, a pivotal connection between the truck and U-shaped frame, a fifth-wheel mounted on said truck, lever-mechanism supported above said fifth-wheel and operable to raise and lower said U-shaped frame, hitch-mechanism including an evener mounted on said frame independently of, and to the rear of the pivotal connection of said truck with, said frame whereby force developed on said frame is transmitted therefrom through said pivotal connection to the truck normally in a forward direction, the aforementioned evener comprising an equalizing bar occupying a position to the rear of the wheels of said truck, links connecting with said equalizing-bar, and a pulley and a chain passing over said pulley and connecting with said bar.

22. In a cultivator, the combination of a supporting-frame having supporting-wheels, means for steering the frame, an elongated supplemental frame connected to said supporting-frame, a two-wheel truck, a pivotal connection between the truck and the forward end of the supplemental frame, a hitch-device connected to the supplemental frame at the rear of the truck-wheels and in proximity to the frame-supporting wheels and in advance of said steering-means, whereby the force applied to the supplemental frame is transmitted therefrom through said pivotal connection to the truck, and a truck-steering device connected to the truck and operable independently of the frame-steering means.

23. In a cultivator, the combination of a supporting-frame having supporting-wheels, means for steering the frame, an elongated supplemental frame connected to said supporting frame, a two-wheel truck, a pivotal connection between the truck and the forward end of the supplemental frame, a hitch-device connected to the supplemental frame at the rear of the truck-wheels and in proximity to the frame-supporting wheels and in advance of said steering-means, whereby the force applied to the supplemental frame is transmitted therefrom through said pivotal connection to the truck, a truck-steering device connected to the truck and operable independently of the frame-steering means, and means carried by the truck and connected to the forward end of the supplemental frame for simultaneously adjusting both frames relatively to the ground.

24. In a cultivator, the combination of a main frame, relatively widely-spaced supporting-wheels mounted thereon, an elongated frame connected to the supporting-frame, a truck, a pivotal connection between the truck and the elongated frame and provided with two transversely-alined, closely-spaced wheels, a frame-raising device mounted on the truck and connected to the forward end of the elongated frame, frame-steering mechanism operable independently of the frame-raising device, a hitch-device disposed on one of said frames to the rear of and distinct from the truck and in close proximity to the frame-supporting wheels and in advance of said frame-steering mechanism, whereby the force applied to said frame is transmitted, as a pushing force, from said frame through said pivotal connection to said truck to facilitate operation of said frame-steering mechanism, and an evener mounted on the elongated frame to the rear of the hitch-device.

25. In a cultivator, a main supporting-frame mounted on ground-wheels, manually-operated means for steering said ground-wheels, a forwardly extending supplemental frame carried by said main frame, a truck, a pivotal connection between the truck and the forward end of said supplemental frame, draft mechanism attached to one of said frames in the rear of and distinct from said truck and in proximity to the ground-wheels and in advance of said wheel-steering means, whereby the force applied to the frame by said draft-mechanism is transmitted in a forward direction from the frame through the pivotal connection to the truck for facilitating operation of said frame-steering means, means for independently steering the truck, and means for varying the vertical relation between the frame and the truck.

26. In a cultivator, the combination with a main-supporting frame and ground-wheels supporting the rear of said frame, of a manually-operated steering mechanism for varying the direction of said ground-wheels, a supplemental frame rigidly connected to and extending forward from said main frame, a draft-mechanism secured to said supplemental frame, a vertical bracket secured to the forward end of said frame in advance of said draft-mechanism, a truck, a pivotal connection between the truck and said bracket, said draft-mechanism being disposed to the rear of and distinct from the truck and in advance of said frame-steering mechanism, whereby the force applied to the frame is transmitted in a forward direction through said pivotal connection to the truck, means operated by the draft-animals for steering said truck, and mechanism carried by the pivot of said truck above said bracket and linked to said frame, whereby the vertical relation of said frame and truck may be adjusted.

In testimony whereof I hereunto set my hand this 22nd day of December, 1908, in the presence of two attesting witnesses.

D. E. LONG.

Witnesses:
 Louis W. Johnson,
 I. W. Sterling.

Copies of this patent may be obtained for five cents each, by addressing the "Commissioner of Patents, Washington, D. C."